United States Patent
Kamimae et al.

(10) Patent No.: US 10,759,337 B2
(45) Date of Patent: Sep. 1, 2020

(54) WORK VEHICLE

(71) Applicant: KOMATSU LTD., Tokyo (JP)

(72) Inventors: Takeshi Kamimae, Tokyo (JP); Nobuo Matsuyama, Tokyo (JP); Shintaro Kobayashi, Tokyo (JP); Muneo Harada, Tokyo (JP)

(73) Assignee: KOMATSU LTD., Tokyo (JP)

( * ) Notice: Subject to any disclaimer, the term of this patent is extended or adjusted under 35 U.S.C. 154(b) by 232 days.

(21) Appl. No.: 15/819,053

(22) Filed: Nov. 21, 2017

(65) Prior Publication Data

US 2018/0354415 A1   Dec. 13, 2018

(30) Foreign Application Priority Data

Jun. 9, 2017   (JP) .................... 2017-114419

(51) Int. Cl.
   *B60Q 1/50*   (2006.01)
   *E01H 5/06*   (2006.01)
   *B60Q 1/26*   (2006.01)

(52) U.S. Cl.
   CPC .......... *B60Q 1/503* (2013.01); *B60Q 1/2615* (2013.01); *E01H 5/061* (2013.01); *E01H 5/066* (2013.01); *B60Q 2400/20* (2013.01)

(58) Field of Classification Search
   CPC ........ B60Q 1/503; B60Q 1/2615; B60Q 1/26; B60Q 1/50; B60Q 1/46; B60Q 2400/20; B60Q 2300/338; E01H 5/061; E01H 5/066; G08B 5/006
   See application file for complete search history.

(56) References Cited

U.S. PATENT DOCUMENTS

| | | | | |
|---|---|---|---|---|
| 1,333,504 A | * | 3/1920 | Monroe | E02F 3/7686 |
| | | | | 172/782 |
| 1,457,862 A | * | 6/1923 | Stockland | E02F 3/7686 |
| | | | | 172/782 |
| 1,592,690 A | * | 7/1926 | Wilson | E01H 5/067 |
| | | | | 37/268 |
| 1,843,260 A | * | 2/1932 | Arnold | E02F 3/7686 |
| | | | | 172/782 |
| 1,847,728 A | * | 3/1932 | Schmid | E02F 9/26 |
| | | | | 172/430 |
| 1,869,916 A | * | 8/1932 | Schmid | E02F 3/7686 |
| | | | | 172/670 |

(Continued)

FOREIGN PATENT DOCUMENTS

JP   H05-287715 A   11/1993

*Primary Examiner* — Jamie L McGowan
(74) *Attorney, Agent, or Firm* — Faegre Drinker Biddle & Reath LLP

(57) ABSTRACT

A work vehicle includes a blade, a shutter, a notification unit, and a controller. The blade includes a lower end. The shutter is attached to the blade. The shutter can be alternatively disposed at a first position at which the shutter protrudes forward from the lower end of the blade or at a second position at which the shutter is farther away from the lower end than at the first position. The notification unit is configured to notify surroundings of the work vehicle about information of the work vehicle. The controller is configured to change information notified by the notification unit in accordance with an arrangement of the shutter at one of the first position and the second position.

5 Claims, 7 Drawing Sheets

(56) References Cited

U.S. PATENT DOCUMENTS

| | | | | |
|---|---|---|---|---|
| 2,284,463 | A * | 5/1942 | Wilson | E02F 3/7659 172/782 |
| 2,400,655 | A * | 5/1946 | Sala | B60Q 1/26 340/470 |
| 2,594,727 | A * | 4/1952 | Burggren | E02F 3/815 172/815 |
| 2,646,633 | A * | 7/1953 | Jahn | E02F 3/7659 172/782 |
| 2,851,674 | A * | 9/1958 | Boone | B60Q 1/387 340/470 |
| 3,229,250 | A * | 1/1966 | Melkonian | B60Q 1/2607 340/468 |
| 3,231,991 | A * | 2/1966 | Wandscheer | E01H 5/063 37/280 |
| 3,726,347 | A * | 4/1973 | Hyman | A01B 13/16 172/666 |
| 4,574,269 | A * | 3/1986 | Miller | B60Q 1/503 340/468 |
| 5,038,136 | A * | 8/1991 | Watson | B60Q 1/50 116/50 |
| 5,073,768 | A * | 12/1991 | Willaredt | B60Q 1/30 340/468 |
| 5,374,876 | A * | 12/1994 | Horibata | G08B 5/006 315/178 |
| 5,377,766 | A * | 1/1995 | Klinger | E01C 19/15 172/382 |
| 5,604,480 | A * | 2/1997 | Lamparter | B60Q 1/50 340/433 |
| 5,764,141 | A * | 6/1998 | Chang | B60Q 1/302 307/10.8 |
| 6,300,870 | B1 * | 10/2001 | Nelson | B60Q 1/503 340/463 |
| 6,515,583 | B1 * | 2/2003 | Lamparter | B60Q 1/503 340/433 |
| 7,048,422 | B1 * | 5/2006 | Solomon | B60Q 1/268 345/76 |
| 7,051,819 | B1 * | 5/2006 | Schenk | E01H 1/003 172/782 |
| 8,606,430 | B2 * | 12/2013 | Seder | B60Q 1/268 340/425.5 |
| 9,616,823 | B1 * | 4/2017 | Salter | B60R 13/005 |
| 9,796,329 | B1 * | 10/2017 | Johnson | B60Q 1/50 |
| 9,896,020 | B2 * | 2/2018 | Dellock | F21S 43/33 |
| 9,908,389 | B2 * | 3/2018 | Volbracht | B60J 3/04 |
| 9,937,853 | B2 * | 4/2018 | Stevens | B60Q 1/2607 |
| 10,132,050 | B1 * | 11/2018 | Mandan | E01H 5/065 |
| 2003/0151502 | A1 * | 8/2003 | Kam | B60Q 1/525 340/435 |
| 2004/0090789 | A1 * | 5/2004 | Golle | A41D 13/01 362/487 |
| 2010/0253539 | A1 * | 10/2010 | Seder | G01S 13/723 340/903 |
| 2010/0253541 | A1 * | 10/2010 | Seder | G01S 13/723 340/905 |
| 2010/0253595 | A1 * | 10/2010 | Szczerba | G01C 21/365 345/7 |
| 2011/0163868 | A1 * | 7/2011 | Gustavsson | B60Q 1/46 340/468 |
| 2012/0013454 | A1 * | 1/2012 | Krugh, IV | B60Q 1/32 340/433 |
| 2012/0299476 | A1 * | 11/2012 | Roberts | B60Q 1/0011 315/77 |
| 2013/0335994 | A1 * | 12/2013 | Mulder | F21V 9/00 362/555 |
| 2017/0161567 | A1 * | 6/2017 | Satomura | G06K 9/00791 |
| 2017/0240098 | A1 * | 8/2017 | Sweeney | B60Q 1/2611 |
| 2017/0259732 | A1 * | 9/2017 | Blevins | B60Q 1/302 |
| 2017/0355306 | A1 * | 12/2017 | Bellotti | B60R 1/00 |
| 2018/0319326 | A1 * | 11/2018 | Daylong | B60Q 1/444 |
| 2019/0126816 | A1 * | 5/2019 | Li | B60Q 1/46 |

* cited by examiner

WORK VEHICLE

This nonprovisional application is based on Japanese Patent Application No. 2017-114419 filed on Jun. 9, 2017 with the Japan Patent Office, the entire contents of which are hereby incorporated by reference.

BACKGROUND OF THE INVENTION

Field of the Invention

The present invention relates to a work vehicle.

Description of the Background Art

Conventionally, there has been a proposed technique related to a vehicle configured to perform snow removal work and including a blade equipped with a shutter arranged so as to be freely raised and lowered, the technique being intended to open and close the shutter by operating a switch, or intended to open and close the shutter when a marker placed on a road is detected (for example, see Japanese Patent Laying-Open No. 05-287715).

SUMMARY OF THE INVENTION

When snow removal work is performed by a motor grader having a blade, a windrow is formed on the side part of the motor grader so as to extend in a ridge shape in the traveling direction of the motor grader. Thus, when the motor grader travels through areas where traffic is obstructed if a windrow is formed thereon, such as an intersection or an entrance of a public facility, the shutter is closed so as to temporarily prevent formation of a windrow.

When a windrow is not formed, a distance through which a vehicle can pass is provided. Thus, it is required to notify a following vehicle traveling behind a motor grader at appropriate timing about the status of the snow removal work.

An object of the present invention is to provide a work vehicle capable of notifying its surroundings about the information of the work vehicle at appropriate timing.

A work vehicle according to the present invention includes a blade, a shutter, a notification unit, and a controller. The blade includes a lower end. The shutter is attached to the blade. The shutter can be disposed alternatively at a first position at which the shutter protrudes forward from the lower end of the blade or at a second position at which the shutter is farther away from the lower end than at the first position. The notification unit is configured to notify surroundings of the work vehicle about information of the work vehicle. The controller is configured to change information notified by the notification unit in accordance with an arrangement of the shutter at one of the first position and the second position.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
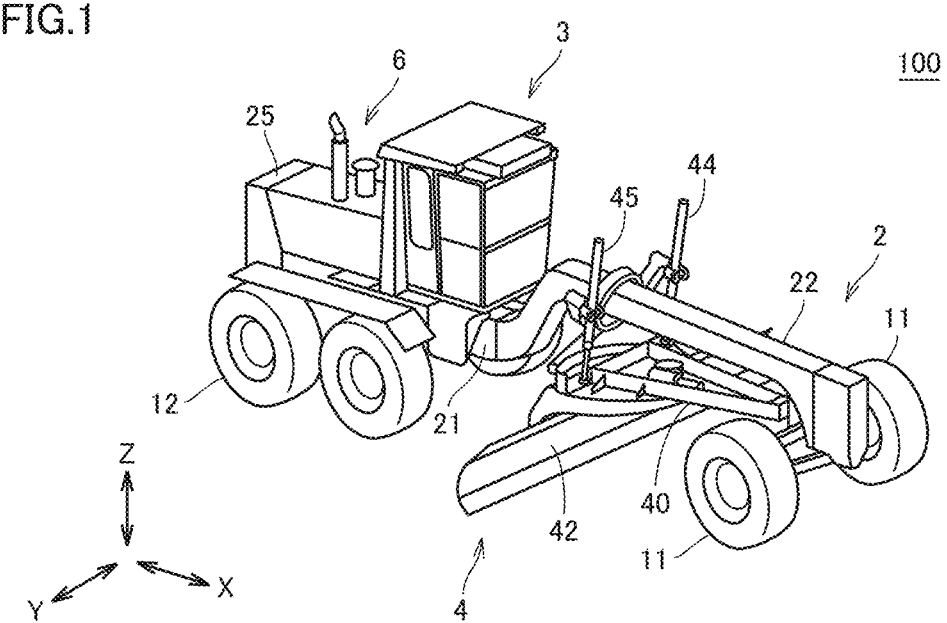
FIG. 1 is a perspective view schematically showing the configuration of a work vehicle according to an embodiment.

The embodiments will be hereinafter described with reference to the accompanying drawings. In the following description, the same components are designated by the same reference characters. Names and functions thereof are also the same. Accordingly, the detailed description thereof will not be repeated.

Figure 2:
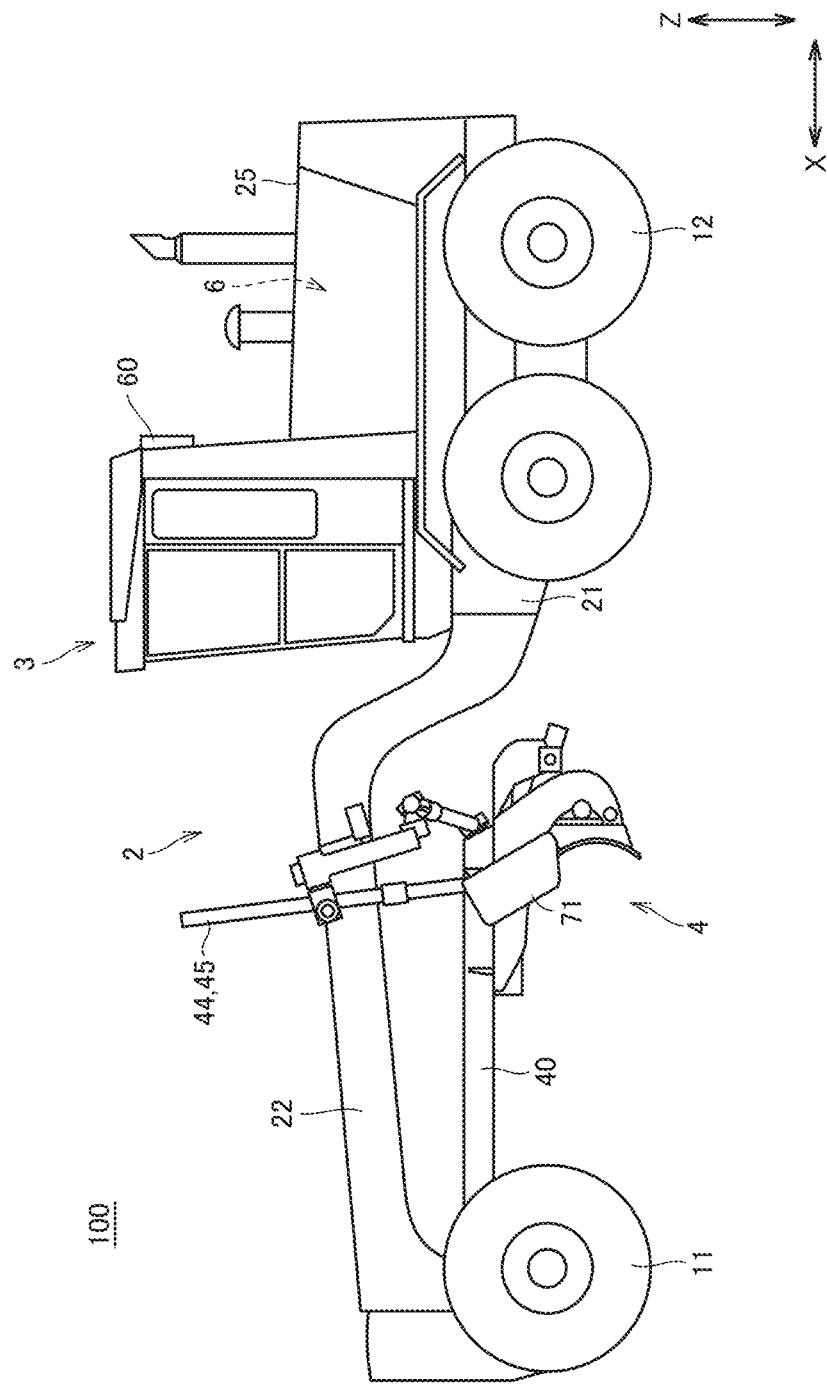
FIG. 2 is a side view schematically showing the configuration of the work vehicle according to an embodiment.

FIG. 1 is a perspective view schematically showing the configuration of a work vehicle 100 according to an embodiment. FIG. 2 is a side view schematically showing the configuration of work vehicle 100 according to an embodiment. In the present embodiment, a motor grader will be described as an example of work vehicle 100.

As shown in FIGS. 1 and 2, work vehicle 100 according to an embodiment mainly includes a front wheel 11 serving as a driving wheel, a rear wheel 12 serving as a driving wheel, a vehicular body frame 2, an operator's cab 3, and a work implement 4. Furthermore, work vehicle 100 includes components such as an engine disposed in an engine compartment 6. Work implement 4 includes a blade 42. Work vehicle 100 travels in the state where blade 42 is brought into contact with the road surface or the state where there is a slight gap between blade 42 and the road surface. Thereby, snow removal work can be carried out by blade 42.

FIGS. 1 and 2 each show a total of six driving wheels including two front wheels 11 (one on each side) and four rear wheels 12 (two on each side), but the number and the arrangement of the front wheels and the rear wheels are not limited to the examples shown in FIGS. 1 and 2.

In the following description of the figures, the direction in which work vehicle 100 travels straight forward is referred to as a front-rear direction of work vehicle 100. In the front-rear direction of work vehicle 100, the direction toward the side on which front wheel 11 is disposed with respect to work implement 4 is referred to as a frontward direction. In the front-rear direction of work vehicle 100, the direction toward the side on which rear wheel 12 is disposed with respect to work implement 4 is referred to as a rearward direction. The right-left direction of work vehicle 100 is the direction orthogonal to the front-rear direction as seen in plan view. From the viewpoint in the frontward direction, the right side and the left side in the right-left direction are respectively the rightward direction and the leftward direction. The top-bottom direction of work vehicle 100 is the direction orthogonal to a plane defined by the front-rear direction and the right-left direction. In the top-bottom direction, the ground side is the lower side and the sky side is the upper side.

The front-rear direction is the front-rear direction with respect to an operator sitting on the operator's seat in operator's cab 3. The right-left direction is the right-left direction with respect to an operator sitting on the operator's seat. The right-left direction is the vehicular width direction of work vehicle 100. The top-bottom direction is the top-bottom direction with respect to an operator sitting on the operator's seat. The direction in which an operator sitting on the operator's seat faces is the frontward direction, and the backward direction with respect to an operator sitting on the operator's seat is the rearward direction. The right side and the left side with respect to an operator sitting on the operator's seat and facing frontward are respectively the rightward direction and the leftward direction. The feet side and the head side of an operator sitting on the operator's seat are respectively the lower side and the upper side.

In the figures as described below, the front-rear direction is indicated by an arrow X, the right-left direction is indicated by an arrow Y, and the top-bottom direction is indicated by an arrow Z.

Vehicular body frame 2 extends in the front-rear direction (right-left direction in FIG. 2). Vehicular body frame 2 includes a rear frame 21 and a front frame 22.

Rear frame 21 supports an exterior cover 25 and components such as an engine disposed in engine compartment 6. The engine is mounted in rear frame 21. The engine is disposed behind operator's cab 3. Exterior cover 25 covers engine compartment 6. Exterior cover 25 defines engine compartment 6 housing the engine. For example, each of four rear wheels 12 described above is supported on rear frame 21 so as to be capable of being rotatably driven with the driving force from the engine.

Front frame 22 is attached frontward of rear frame 21. Front frame 22 is coupled to rear frame 21 so as to be pivotable. Front frame 22 extends in the front-rear direction. Front frame 22 includes a base end coupled to rear frame 21 and a leading end on the opposite side to the base end. The base end of front frame 22 is coupled to the leading end of rear frame 21 via a vertical center pin.

To the front end of front frame 22, for example, two front wheels 11 described above are attached so as to be rotatable. Work vehicle 100 may be configured in a rear-wheel drive system, or may be configured in an all-wheel drive system in which each of front wheels 11 and rear wheels 12 is rotatably driven with the driving force from the engine.

Front wheels 11 are attached to front frame 22 so as to be revolvable by extension and contraction of the steering cylinder (not shown). Work vehicle 100 can change its traveling direction by extension and contraction of the steering cylinder. The steering cylinder can be extended and contracted by operating the handle or the steering control lever provided inside operator's cab 3.

Operator's cab 3 has an interior space in which an operator is aboard, and is mounted at the front end portion of rear frame 21. Inside operator's cab 3, operation units such as a handle for a revolving operation, a shift lever, a control lever of work implement 4, a brake, an accelerator pedal, and an inching pedal are provided. Operator's cab 3 has a front portion, side portions on the right and left sides, and a rear portion. The space surrounded by the front portion, the side portions and the rear portion forms an interior space in operator's cab 3. In addition, operator's cab 3 may be mounted on front frame 22.

Work implement 4 mainly includes a drawbar 40, a blade 42, and a pair of lift cylinders 44 and 45.

The front end of drawbar 40 is attached to the leading end of front frame 22 so as to be swingable. The rear end of drawbar 40 is supported by the pair of lift cylinders 44 and 45 on front frame 22.

By extension and contraction of the pair of lift cylinders 44 and 45, the rear end of drawbar 40 can be vertically raised and lowered with respect to front frame 22. By contraction of both lift cylinders 44 and 45, the height of blade 42 relative to front frame 22 and front wheels 11 is adjusted in the upward direction. By extension of both lift cylinders 44 and 45, the height of blade 42 relative to front frame 22 and front wheels 11 is adjusted in the downward direction.

Furthermore, drawbar 40 is capable of swinging upward and downward about the axis along the vehicle traveling direction as lift cylinders 44 and 45 are differently extended and contracted.

Blade 42 is disposed between front wheels 11 and rear wheels 12. Blade 42 has a shape of a curved surface that is smoothly curved as seen from the side. Blade 42 has a front surface as a surface on the inside of the curve and a rear surface as a surface on the outside of the curve. The front surface of blade 42 has a shape of a curved surface that is curved in a concave shape. The rear surface of blade 42 has a shape of a curved surface that is curved in a convex shape. Blade 42 is supported on drawbar 40. Blade 42 is supported on front frame 22 through drawbar 40.

As described above, blade 42 is configured such that it can be raised and lowered with respect to the vehicle via drawbar 40 and also can be swung about the axis along the vehicle traveling direction via drawbar 40.

A blade shutter apparatus 70 is attached to the left end of blade 42. Blade shutter apparatus 70 includes a shutter 71. Shutter 71 is configured such that it can be disposed alternatively at the first position at which shutter 71 protrudes forward from the lower end of blade 42 or at the second position at which shutter 71 is farther away from the lower end of blade 42 than at the first position. Shutter 71 shown in FIG. 2 is disposed at the second position. The details of blade shutter apparatus 70 will be described later.

Blade shutter apparatus 70 may be attached to the right end of blade 42. Blade shutter apparatus 70 may be attached to one of the left end and the right end of blade 42, or may be attached to both the left end and the right end of blade 42.

A display unit 60 is provided at the upper end portion on the rear surface of operator's cab 3. Display unit 60 has a function as a notification unit configured to show information about work vehicle 100 for notifying the surroundings of work vehicle 100 about the information. Display unit 60 shown in FIG. 2 has a display surface that faces in the rearward direction. Display unit 60 can be visible from the following vehicle that travels behind work vehicle 100. Display unit 60 shows the information regarding the work status of work vehicle 100 so as to be visible from the surroundings of work vehicle 100, and typically, from behind work vehicle 100.

In addition to the configurations shown in FIGS. 1 and 2, work vehicle 100 may include a rough-surface forming apparatus configured to provide scratches in streak shape on the surface of the compacted-snow covered road so as to be roughened. The rough-surface forming apparatus may be disposed so as to protrude rearward from rear frame 21.

Figure 3:
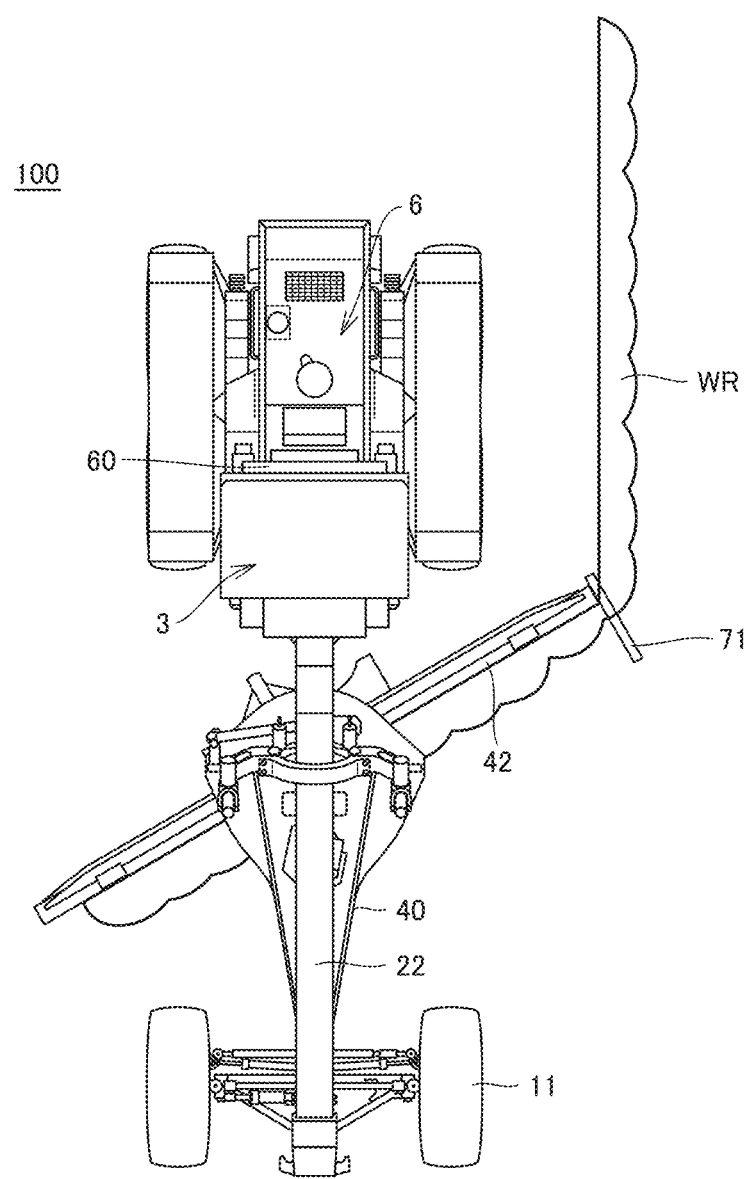
FIG. 3 is a top view showing snow removal work of the work vehicle according to an embodiment.

FIG. 3 is a top view showing snow removal work of work vehicle 100 according to an embodiment. When work vehicle 100 travels in the state where shutter 71 of blade shutter apparatus 70 is disposed at the second position, the snow removed from the road surface by blade 42 is accumulated as a windrow WR on the left side of work vehicle 100. The second position of shutter 71 may also be referred to as a windrow formation position at which windrow WR is formed on the side of work vehicle 100 during traveling of work vehicle 100.

Figure 4:
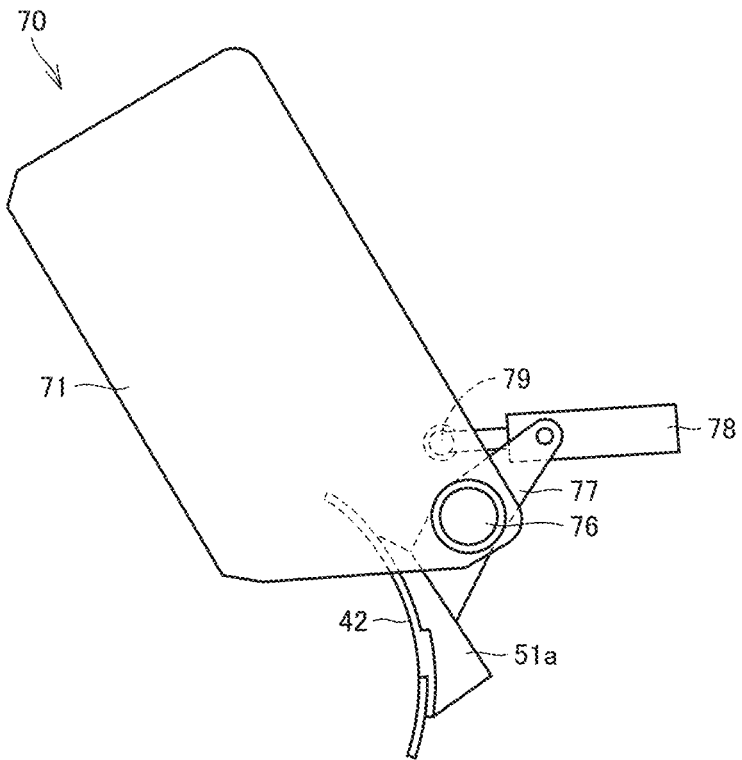
FIG. 4 is a side view showing the state where a shutter of a blade shutter apparatus is disposed at the second position.
Figure 5:
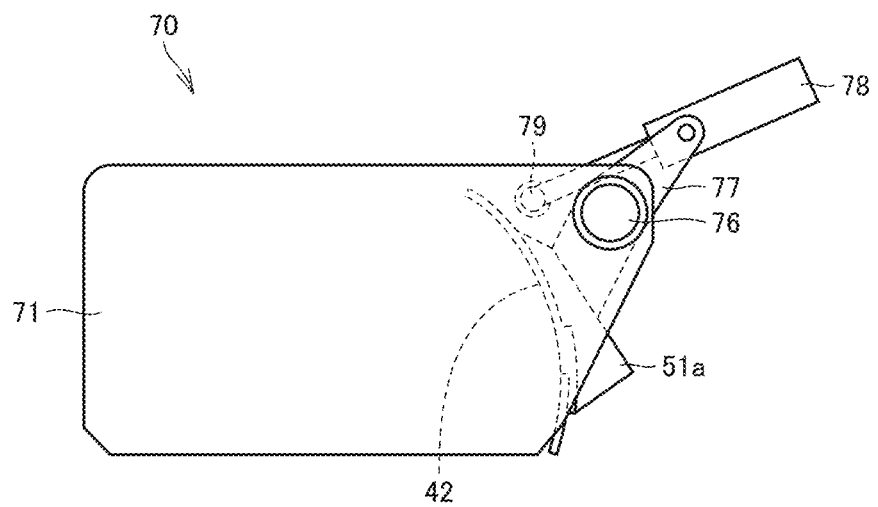
FIG. 5 is a side view showing the state where the shutter of the blade shutter apparatus is disposed at the first position.

FIG. 4 is a side view showing the state where shutter 71 of blade shutter apparatus 70 is disposed at the second position. FIG. 5 is a side view showing the state where shutter 71 of blade shutter apparatus 70 is disposed at the first position.

As shown in FIGS. 4 and 5, blade 42 has a support bracket 51a. Support bracket 51a is fixed to the rear surface of blade 42. A coupling bracket 77 is attached to support bracket 51a. A pivot shaft 76 is provided at coupling bracket 77. Shutter 71 is provided so as to be pivotable relative to support bracket 51a about pivot shaft 76. A cylinder 78 is coupled to coupling bracket 77.

Cylinder 78 includes a rod that has a tip end provided with a pin 79. Shutter 71 is coupled to cylinder 78 through pin 79. By extension and contraction of cylinder 78, shutter 71 is moved relative to blade 42. By contraction of cylinder 78, shutter 71 is raised and disposed at the second position shown in FIG. 4. By extension of cylinder 78, shutter 71 is lowered and disposed at the first position shown in FIG. 5.

Figure 6:
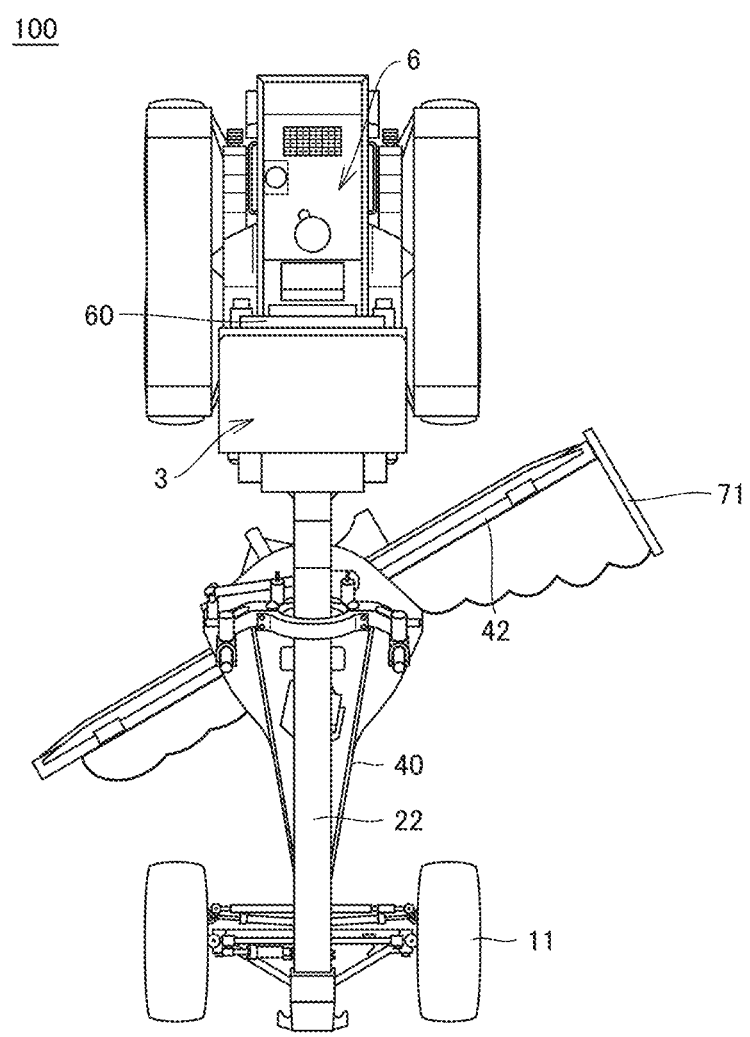
FIG. 6 is a top view showing snow removal work of the work vehicle in the state where the shutter is disposed at the first position.

FIG. 6 is a top view showing snow removal work of work vehicle 100 in the state where shutter 71 is disposed at the first position. In the state where shutter 71 of blade shutter apparatus 70 is disposed at the first position, even if work vehicle 100 travels, the snow removed from the road surface is accumulated by shutter 71 on the front surface of blade 42 but does not flow out in the lateral direction. Accordingly, no windrow is formed on the left side of work vehicle 100 as shown in FIG. 6. The first position of shutter 71 may also be referred to as a windrow non-formation position at which windrow WR is not formed on each side of work vehicle 100 during traveling of work vehicle 100.

Shutter 71 is disposed to face the end face of blade 42 in the right-left direction and protrude laterally from blade 42. As seen in the longitudinal direction of blade 42, shutter 71 disposed at the first position covers most of blade 42. As seen in the longitudinal direction of blade 42, shutter 71 disposed at the second position covers only a part of the vicinity of the upper end of blade 42. Blade 42 is laterally covered more by shutter 71 disposed at the first position than by shutter 71 disposed at the second position. Shutter 71 disposed at the second position does not cover the lower end of blade 42. When shutter 71 is disposed at the second position, the lower end of blade 42 is exposed laterally as shown in FIG. 4.

Shutter 71 is not necessarily disposed to face the end face of blade 42. For example, shutter 71 may be disposed so as to face the front surface of blade 42. In this case, shutter 71 disposed at the first position may be disposed such that most of this shutter 71 faces the front surface of blade 42, whereas shutter 71 disposed at the second position may be disposed such that most of this shutter 71 does not face the front surface of blade 42. In an arrangement where windrow WR is formed on the side of work vehicle 100 while work vehicle 100 is traveling in the state where shutter 71 is disposed at the second position, but windrow WR is not formed on the side of work vehicle 100 in the state where shutter 71 is disposed at the first position, an optional arrangement of shutter 71 and optional means for attaching shutter 71 to blade 42 may be selected as appropriate.

Figure 7:
FIG. 7 is a diagram showing the first example of information shown on a display unit.
Figure 8:
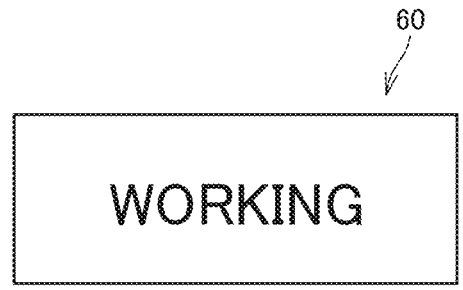
FIG. 8 is a diagram showing the second example of the information shown on the display unit.
Figure 9:
FIG. 9 is a diagram showing the third example of the information shown on the display unit.

FIGS. 7 to 9 each are a diagram showing an example of the information shown on display unit 60. Display unit 60 may show, to a following vehicle, a warning display shown in FIG. 7 for indicating that overtaking of work vehicle 100 is prohibited, for example. Alternatively, display unit 60 may show, to a following vehicle, a warning display shown in FIG. 8 for indicating that work such as snow removal work is in progress. Alternatively, display unit 60 may show, to a following vehicle, a caution display shown in FIG. 9 for giving a caution on overtaking work vehicle 100 even though overtaking of work vehicle 100 is allowed at that time.

Figure 10:
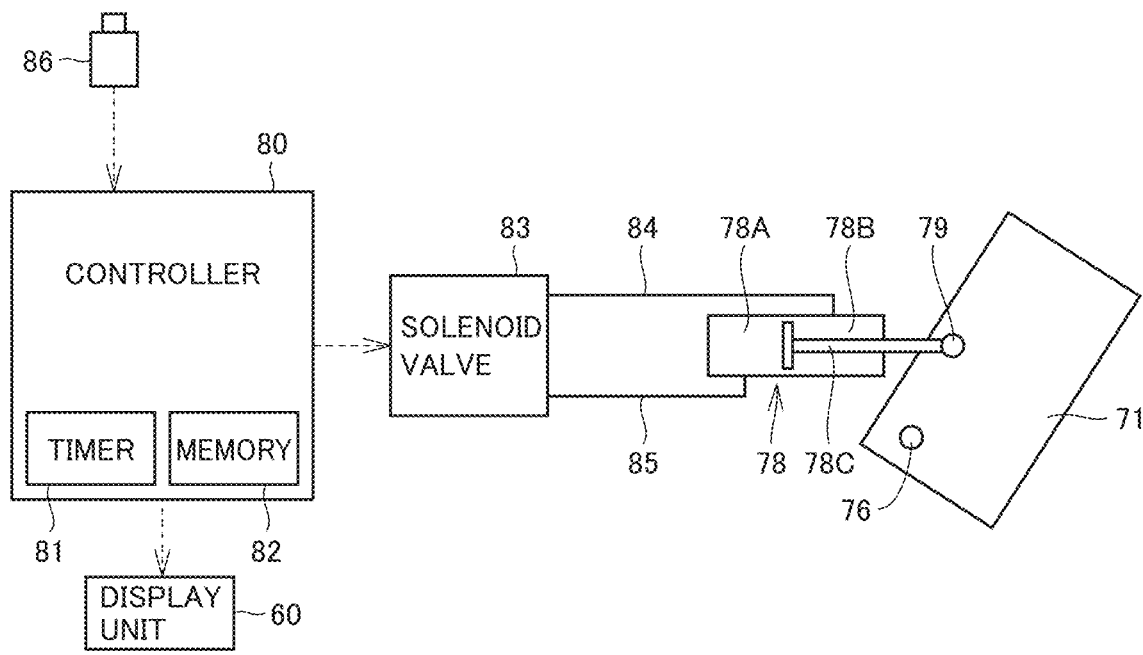
FIG. 10 is a diagram illustrating a functional block of the work vehicle according to an embodiment.

FIG. 10 is a diagram illustrating a functional block of work vehicle 100 according to an embodiment. As shown in FIG. 10, work vehicle 100 includes a controller 80 for controlling the operation of work vehicle 100. Controller 80 includes a timer 81 and a memory 82. Timer 81 measures time. Memory 82 is provided as a region storing a program for executing various operations in work vehicle 100 and also storing necessary data. Controller 80 performs various processes based on the program stored in memory 82.

Work vehicle 100 includes a solenoid valve 83. Solenoid valve 83 is disposed in an oil passage configured to couple a hydraulic pump (not shown) and cylinder 78. Oil passages 84 and 85 shown in FIG. 10 each are a part of the oil passage coupling the hydraulic pump and cylinder 78, and arranged between solenoid valve 83 and cylinder 78. Oil passages 84 and 85 each are located downstream of solenoid valve 83 in the direction in which oil flows from the hydraulic pump toward cylinder 78.

Solenoid valve 83 is controlled based on a control signal from controller 80. The hydraulic pressure supplied to cylinder 78 is adjusted by solenoid valve 83. Cylinder 78 includes a bottom-side oil chamber 78A and a head-side oil chamber 78B. Oil passage 84 is connected to head-side oil chamber 78B. Oil passage 85 is connected to bottom-side oil chamber 78A. Based on the control signal from controller 80, solenoid valve 83 can adjust the amount of oil supplied through oil passage 84 into head-side oil chamber 78B and the amount of oil supplied through oil passage 85 into bottom-side oil chamber 78A.

A rod 78C of cylinder 78 is moved by supplying the appropriate hydraulic pressure into bottom-side oil chamber 78A and head-side oil chamber 78B. Thereby, shutter 71 coupled to pin 79 at the end of rod 78C is rotated about pivot shaft 76 in either direction. Shutter 71 is moved in the direction in which shutter 71 becomes closer to the lower end of blade 42 from the second position toward the first position, or moved in the direction in which shutter 71 becomes farther away from the lower end of blade 42 from the first position toward the second position. Solenoid valve 83 and cylinder 78 constitute an actuator configured to move shutter 71 from one to the other between the first position and the second position.

Work vehicle 100 includes an input operation unit 86. Input operation unit 86 is disposed in operator's cab 3. The operator aboard operator's cab 3 inputs an operation instruction for solenoid valve 83 into input operation unit 86.

Input operation unit 86 in the embodiment has one push-button switch. Input operation unit 86 is not limited to a push-button switch, but may have an optional configuration by which an operator can input an operation instruction to cylinder 78. Input operation unit 86 may have other types of switches such as a toggle switch or a rotary switch. Input operation unit 86 may have a touch panel.

Input operation unit 86 receives an input of an operation instruction to extend cylinder 78 for lowering shutter 71 so as to be moved from the second position to the first position. In response to reception of this input, controller 80 transmits a control signal to solenoid valve 83 to supply oil into bottom-side oil chamber 78A through oil passage 85. Thereby, cylinder 78 is extended to cause shutter 71 to move from the second position to the first position.

Furthermore, input operation unit 86 is configured to be capable of receiving an input of an operation instruction to contract cylinder 78 for raising shutter 71 so as to be moved from the first position to the second position. In response to reception of this input, controller 80 transmits a control signal to solenoid valve 83 to supply oil into head-side oil chamber 78B through oil passage 84. Thereby, cylinder 78 is contracted to cause shutter 71 to move from the first position to the second position.

Controller 80 also controls the display contents on display unit 60 described above. In response to the instruction from controller 80 to display unit 60, display unit 60 shows a warning display or a caution display for a following vehicle.

Display unit 60 is an electronic message board, for example, and configured to be capable of showing optional characters using a light emitting diode. Controller 80 can control display unit 60 to show a warning display and a caution display in different colors. Controller 80 may transmit, to display unit 60, a command signal to show a warning display in the first character color, for example, in red color. Controller 80 may transmit, to display unit 60, a command signal to show a caution display in the second character color different from the first character color, for example, in green color. A character color to be selected for showing a warning display is more likely to give a caution to a viewer than by the character color used for showing a caution display.

Figure 11:
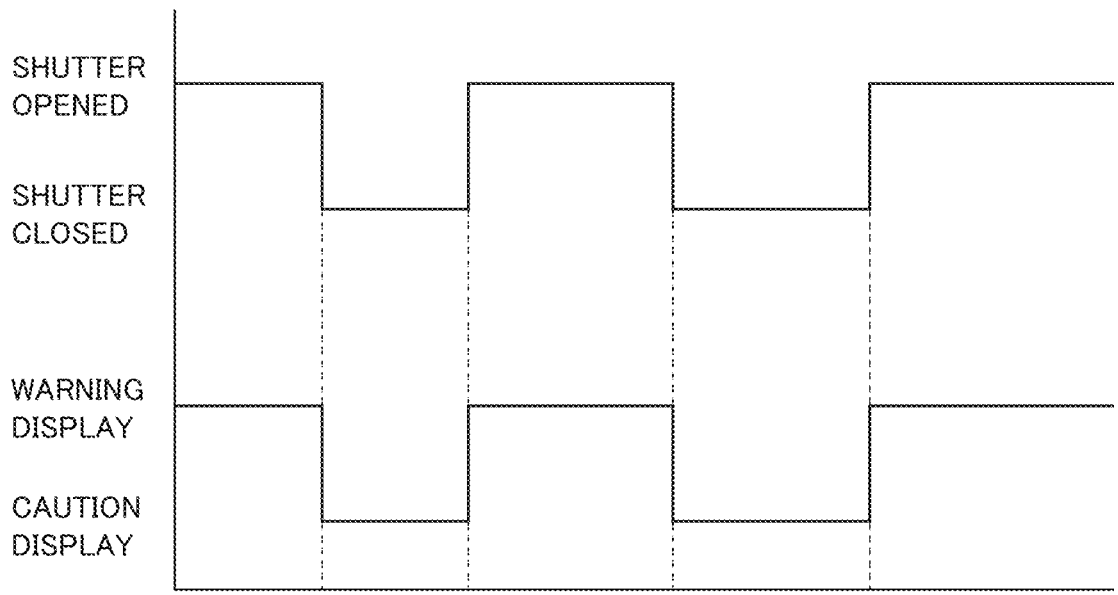
FIG. 11 is a timing chart illustrating opening/closing of the shutter and displays shown on a display unit.

FIG. 11 is a timing chart illustrating opening/closing of shutter 71 and displays shown on display unit 60. "Shutter Opened" shown in FIG. 11 indicates the state where shutter 71 is at the second position while "Shutter Closed" indicates the state where shutter 71 is at the first position.

In the state where shutter 71 is opened, windrow WR is formed on the side of work vehicle 100 during traveling of work vehicle 100. The following vehicle that travels behind work vehicle 100 cannot drive over windrow WR to overtake work vehicle 100. Thus, as shown in FIG. 11, in the state where shutter 71 is opened, display unit 60 shows a warning display.

Starting from the state where shutter 71 is opened, input operation unit 86 is operated, for example, the operation to press a push-button switch described above is performed, thereby causing controller 80 to transmit a control signal to solenoid valve 83 to supply oil into bottom-side oil chamber 78A. Cylinder 78 having bottom-side oil chamber 78A supplied with oil is extended, thereby causing shutter 71 to be moved and brought into a closed state.

Controller 80 having received an input obtained by operating input operation unit 86 transmits a control signal to display unit 60 to change the information shown on display unit 60. Display unit 60 having received the control signal changes the information shown on display unit 60 from a warning display to a caution display.

In the state where shutter 71 is closed, windrow WR is not formed on the side of work vehicle 100 during traveling of work vehicle 100. The following vehicle can pass through the section in which windrow WR is not formed, and then, can overtake work vehicle 100. Accordingly, in the state where shutter 71 is closed, display unit 60 shows a caution display.

Starting from the state where shutter 71 is closed, input operation unit 86 is operated once again, thereby causing controller 80 to transmit a control signal to solenoid valve 83 to supply oil into head-side oil chamber 78B. Cylinder 78 having head-side oil chamber 78B supplied with oil is contracted, thereby causing shutter 71 to be moved and brought into an opened state.

Controller 80 having received an input obtained by operating input operation unit 86 transmits a control signal to display unit 60 to change the information shown on display unit 60. Display unit 60 having received the control signal changes the information shown on display unit 60 from a caution display to a warning display.

In this way, shutter 71 can be opened and closed, and the information shown on display unit 60 can be changed in conjunction with the arrangement of shutter 71 at one of the first position and the second position.

The following will be a summarized explanation about the characteristic configuration and functions and effects of work vehicle 100 according to the above-described embodiment. The configurations in the embodiment are designated by reference numerals, which are however given by way of example.

Work vehicle 100 according to the embodiment includes display unit 60 and controller 80 as shown in FIG. 10. As shown in FIG. 11, controller 80 changes the information shown on display unit 60 in accordance with the arrangement of shutter 71 at one of the first position ("shutter closed" position) and the second position ("shutter opened" position).

It is troublesome for an operator aboard work vehicle 100 performing snow removal work to manually perform the operation for opening and closing shutter 71 and the operation for changing a display on display unit 60, in addition to the operation for causing work vehicle 100 to travel. In work vehicle 100 according to the embodiment, the information shown on display unit 60 is changed automatically in conjunction with the operation for moving shutter 71 from one to the other between the first position and the second position. Thereby, the surroundings of work vehicle 100 can be notified at appropriate timing about the information of work vehicle 100, specifically, the information as to whether shutter 71 is located at the first position or the second position at that time. Since the operator does not have to input an operation instruction for changing the information shown on display unit 60, the load upon the operator can be alleviated.

Also as shown in FIGS. 7 to 9, display unit 60 shows the information about work vehicle 100 so as to be visible from the surroundings of work vehicle 100. In this way, the viewer located in the surrounding area of work vehicle 100 can visually see display unit 60, so that this viewer can confirm the information about work vehicle 100 obtained at that time.

Also as shown in FIGS. 7 to 9 and 11, when shutter 71 is at the second position, display unit 60 shows, to a following vehicle traveling behind work vehicle 100, a warning display indicating that overtaking of work vehicle 100 is prohibited. When shutter 71 is at the first position, display unit 60 shows, to a following vehicle, a caution display giving a caution on overtaking work vehicle 100.

During the snow removal work of work vehicle 100, a windrow is formed when shutter 71 is at the second position, but a windrow is not formed when shutter 71 is at the first position. By showing a warning display when shutter 71 is at the second position, it becomes possible to avoid a situation in which a following vehicle trying to overtake work vehicle 100 drives over a windrow or collides with a windrow. By showing a caution display when shutter 71 is at the first position, it becomes possible to notify a following vehicle at appropriate timing that a windrow is not formed at that time so that this following vehicle can overtake work vehicle 100.

Furthermore, a warning display is shown in the first color, and a caution display is shown in the second color different from the first color. In this way, a viewer located in the surrounding area of work vehicle 100 can readily distinguish between a warning display and a caution display.

Also as shown in FIG. 2, display unit 60 is provided on the rear surface of operator's cab 3. By arranging display unit 60 on the rear surface of operator's cab 3 that is located at a relatively high position in work vehicle 100, the viewer located in the surrounding area of work vehicle 100 can more readily visually see display unit 60.

In the embodiment having been described above, controller 80 receives an input obtained by operating input operation unit 86 to change the information shown on display unit 60, but is not limited thereto. The trigger for controller 80 to change the information shown on display unit 60 may be an optional input. For example, controller 80 may change the information shown on display unit 60 using an elapsed time period measured by timer 81. For example, also by receiving, from the sensor for detecting the position of shutter 71, an input of the detection result showing that the position of shutter 71 has been moved from one to the other between the first position and the second position, controller 80 may change the information shown on display unit 60. This sensor may be a cylinder stroke sensor attached to cylinder 78, or may be a proximity sensor for detecting shutter 71 itself.

In the embodiment, an explanation has been given with regard to an example in which display unit 60 is provided on the rear surface of operator's cab 3, but an arrangement of display unit 60 may be optional. For example, display unit 60 may be provided at the rearward portion of the vehicular body, typically, on the rear surface of an engine hood. Even if display unit 60 is arranged in this way, the work status of work vehicle 100 can be displayed so as to be visible to a following vehicle.

In the embodiment, an explanation has been given with regard to an example in which work vehicle 100 includes display unit 60 that is visually seen from the surroundings of work vehicle 100, so that the surroundings are notified about the information of work vehicle 100. The notification unit configured to notify the surroundings about the information of work vehicle 100 is not limited to display unit 60. For example, the notification unit may have an auralization device such as a siren or a speaker configured to notify the surroundings about the information of work vehicle 100 by audible sound. The notification unit can include one of a display unit and an auralization device, or can also include both a display unit and an auralization device in combination.

In the embodiments as described above, a motor grader has been described as an example of work vehicle 100, but work vehicle 100 is not limited to a motor grader. For example, work vehicle 100 may be a snow removal truck equipped with a plough or a blade.

The snow removal work performed by work vehicle 100 has been described in each embodiment, but the concept of each embodiment may be applied when work vehicle 100 performs a land grading operation for leveling the road surface.

Although work vehicle 100 includes operator's cab 3 in each embodiment, work vehicle 100 does not necessarily have to include operator's cab 3. Work vehicle 100 is not limited to the configuration in which an operator aboard work vehicle 100 operates work vehicle 100, but may be a configuration in which work vehicle 100 is operated by remote control from outside. In this case, since work vehicle 100 does not require operator's cab 3 for an operator to get aboard, work vehicle 100 does not have to include operator's cab 3.

Although the embodiments of the present invention have been described as above, it should be understood that the embodiments disclosed herein are illustrative and non-restrictive in every respect. The scope of the present invention is defined by the terms of the claims, and is intended to include any modifications within the meaning and scope equivalent to the terms of the claims.

What is claimed is:

1. A work vehicle comprising:
    a blade including a lower end;
    a shutter attached to the blade, the shutter being capable of being disposed alternatively at a first position at which the shutter protrudes forward from the lower end of the blade or at a second position at which the shutter is farther away from the lower end of the blade than at the first position;
    a notification unit configured to notify surroundings of the work vehicle about information of the work vehicle;
    an input operation unit into which an operation instruction is input by an operator; and
    a controller,
    the controller being configured to:
    receive an input of an operation instruction to the input operation unit,
    generate a control signal to cause the shutter to move from one to the other between the first position and the second position based on the received input, and
    automatically change information notified by the notification unit in conjunction with movement of the shutter from one to the other between the first position and the second position.

2. The work vehicle according to claim 1, wherein the notification unit includes a display unit configured to show the information of the work vehicle so as to be visible from the surroundings of the work vehicle.

3. The work vehicle according to claim 2, wherein
    when the shutter is at the second position, the display unit shows a warning display to a following vehicle traveling behind the work vehicle, the warning display indicating that overtaking of the work vehicle is prohibited, and
    when the shutter is at the first position, the display unit shows a caution display to the following vehicle, the caution display giving a caution on overtaking the work vehicle.

4. The work vehicle according to claim 3, wherein
    the warning display is shown in a first color, and
    the caution display is shown in a second color different from the first color.

5. The work vehicle according to claim 2, further comprising an operator's cab in which an operator operating the work vehicle is aboard, wherein
    the display unit is provided on a rear surface of the operator's cab.

* * * * *